(12) United States Patent
Huang et al.

(10) Patent No.: US 8,406,323 B2
(45) Date of Patent: Mar. 26, 2013

(54) ORTHOGONAL FREQUENCY DIVISION MULTIPLEXING USING SUBSYMBOL PROCESSING

(75) Inventors: Xiaojing Huang, North Ryde (AU); Darryn Lowe, Helensburgh (AU)

(73) Assignee: Agere Systems LLC, Allentown, PA (US)

( * ) Notice: Subject to any disclaimer, the term of this patent is extended or adjusted under 35 U.S.C. 154(b) by 1085 days.

(21) Appl. No.: 12/299,348

(22) PCT Filed: Nov. 29, 2006

(86) PCT No.: PCT/US2006/045578
§ 371 (c)(1),
(2), (4) Date: Nov. 3, 2008

(87) PCT Pub. No.: WO2007/145660
PCT Pub. Date: Dec. 21, 2007

(65) Prior Publication Data
US 2009/0207926 A1    Aug. 20, 2009

Related U.S. Application Data

(60) Provisional application No. 60/813,667, filed on Jun. 14, 2006.

(51) Int. Cl.
H04K 1/10 (2006.01)
H04L 27/28 (2006.01)
(52) U.S. Cl. .................... 375/260; 375/299; 375/316
(58) Field of Classification Search .................. 375/132, 375/133, 135, 136, 259–261, 268–269, 279, 375/295, 316
See application file for complete search history.

(56) References Cited

U.S. PATENT DOCUMENTS

| 7,499,496 B2 | 3/2009 | Fujii et al. |
| 2003/0123383 A1* | 7/2003 | Korobkov et al. ............ 370/208 |

(Continued)

FOREIGN PATENT DOCUMENTS

| EP | 1 357 718 A2 | 4/2003 |
| WO | WO 98/10567 A1 | 3/1998 |

(Continued)

OTHER PUBLICATIONS

Japanese Office Action; Mailed on Nov. 14, 2011 for corresponding Japanese Application No. 2009-515379.

(Continued)

*Primary Examiner* — David C. Payne
*Assistant Examiner* — James M Perez
(74) *Attorney, Agent, or Firm* — Mendelsohn, Drucker, & Associates, P.C.; Craig M. Brown; Steve Mendelsohn

(57) ABSTRACT

In one embodiment, a transmitter converts digital input data into combined-OFDM signals and a receiver recovers data from the transmitted combined-OFDM signals. For transmission, digital data is mapped into data symbols using a commonly known modulation technique, such as QAM or DQPSK. The data symbols are subsequently divided into two or more groups according to a specified grouping pattern. Each group of data symbols is then converted into a separate OFDM subsymbol using IFFT processing. The OFDM subsymbols are then combined according to a specified combining pattern to create a combined-OFDM symbol. Combined-OFDM symbols are then prepared for transmission by affixing cyclic prefixes, converting the symbols to analog format, and performing spectral shaping of the analog signal. Upsampling may be employed to increase the signal bandwidth. In alternative embodiments, OFDM subsymbols may be combined using interleaving to create an interleaved-OFDM symbol.

31 Claims, 8 Drawing Sheets

U.S. PATENT DOCUMENTS

2004/0071079 A1* 4/2004 Han .............................. 370/210
2004/0081131 A1* 4/2004 Walton et al. ................. 370/344
2005/0100112 A1* 5/2005 Yoshida et al. ............... 375/279

FOREIGN PATENT DOCUMENTS

WO     WO2005041515 A1     5/2005

OTHER PUBLICATIONS

"A Novel Peak Power Reduction Scheme for OFDM," by Stefan H. Müller and Johannes B. Huber, IEEE, vol. 3, Sep. 1997, pp. 1090-1094.

European Office Action; Mailed Jul. 13, 2011 for the corresponding EP Application No. 06 838 501.2.

Chinese Office Action; Mailed Mar. 3, 2011 for the corresponding Chinese Application No. 200680054957.8.

Chinese Office Action; Mailed Apr. 6, 2012 for corresponding CN Application No. 200680054957.8.

Notice of Preliminary Rejection; Mailed on Dec. 31, 2012 for the corresponding Korean Application No. 10-2008-7031967.

\* cited by examiner

ORTHOGONAL FREQUENCY DIVISION MULTIPLEXING USING SUBSYMBOL PROCESSING

CROSS-REFERENCE TO RELATED APPLICATIONS

This application claims the benefit of the filing date of U.S. provisional application No. 60/813,667, filed on Jun. 14, 2006, the teachings of which are incorporated herein by reference.

BACKGROUND OF THE INVENTION

1. Field of the Invention

The present invention relates to signal processing, and more specifically to orthogonal frequency division multiplexing techniques used in signal transmission and reception.

2. Description of the Related Art

Orthogonal frequency division multiplexing (OFDM) is a signal processing technology well known in the field of communications. In general, OFDM operates by dividing a frequency spectrum into smaller subbands (a.k.a. subcarriers) and modulating these subcarriers with data symbols.

FIG. 1 shows a simplified block diagram of one implementation of a prior-art OFDM transmitter 100. Transmitter 100 receives digital input data and converts the data into analog OFDM signals for transmission. Conversion of the data occurs through sequential steps of data symbol mapping 102, inverse fast Fourier transform (IFFT) processing 104, cyclic prefix appending 106, digital-to-analog conversion (DAC) 108, and spectral shaping 110.

Data symbol mapping block 102 receives binary bits of data, which are divided into groups of finite length. One or more data symbols a[n] are created for each group of bits, using any one of a number of modulation techniques commonly known in the art, such as differential quadrature phase-shift-keying (DQPSK) or quadrature amplitude modulation (QAM). The length of each group and thus the number of input data bits per data symbol is determined by the modulation technique employed.

IFFT 104 subsequently applies each set of N data symbols a[n] to a set of N subcarriers, which are numbered from 0 to N−1, where one data symbol a[n] is paired with each subcarrier. The subcarriers employed by OFDM are arranged orthogonally to one another, so that each subcarrier can be distinguished without intersymbol interference. Each set k of N data symbol a[n] and subcarrier pairs is then converted by IFFT 104 from frequency-domain representations into a time-domain OFDM symbol $S_k$, consisting of N samples $S_k[i]$, where i equals 0 to N−1. The discrete model for each OFDM symbol $S_k$ may be expressed by Equation (1) as follows:

$$S_k[i] = S_k\left(i\frac{T}{N}\right) \quad (1)$$
$$= \sum_{n=0}^{N-1} a[n]e^{j\frac{2\pi}{N}ni}w[i]$$
$$= \sum_{n=0}^{N-1} a[n]c[i,n]$$

where T/N is the sample period, w[i] is a discrete window function, and $$c[i,n] = e^{j\frac{2\pi}{N}ni}w[i]$$

denotes the finite length complex exponential sequence of the subcarriers.

The OFDM symbols $S_k$ are then prepared for transmission. First, a cyclic prefix is inserted at the beginning of each OFDM symbol $S_k$ by cyclic prefix appending 106. This prefix enables the receiver to cope with signal echoes that result from multipath reflections. Next, the OFDM symbols and prefixes are converted from digital format to analog format using digital-to-analog converter (DAC) 108. Finally, the analog output from DAC 108 undergoes spectral shaping by spectral shaping block 110 to produce an OFDM signal for transmission.

As an example of the production of a prior-art OFDM signal, assume that IFFT 104 receives 384 data symbols a[n], where n=0, ..., 383, and employs N=128 subcarriers. Since one data symbol a[n] in each set of N data symbols a[n] is assigned to each subcarrier, the number of OFDM symbols $S_k$ generated is equal to 3 (384 data symbols a[n] divided by 128 subcarriers). The grouping of data symbols a[n] in the frequency domain is shown in Table I. As shown in Table I, in a prior-art OFDM system, data symbols a[0] to a[127] are assigned to OFDM symbol $S_0$, data symbols a[128] to a[255] are assigned to OFDM symbol $S_1$, and data symbols a[256] to a[383] are assigned to OFDM symbol $S_2$.

TABLE I

GROUPING OF DATA SYMBOLS a[n] IN THE FREQUENCY DOMAIN OF A PRIOR-ART OFDM SIGNAL

| Subcarrier Index | 0 | 1 | 2 | 3 | ... | 127 |
|---|---|---|---|---|---|---|
| OFDM Symbol 0 ($S_0$) | a[0] | a[1] | a[2] | a[3] | ... | a[127] |
| OFDM Symbol 1 ($S_1$) | a[128] | a[129] | a[130] | a[131] | ... | a[255] |
| OFDM Symbol 2 ($S_2$) | a[256] | a[257] | A[258] | a[259] | ... | a[383] |

Table II shows the grouping of samples $S_k[i]$, where k=0, 1, 2 and i=0, ..., 127, in the time domain after conversion by IFFT 104. In a prior-art OFDM system, the samples $S_k[i]$ of each OFDM symbol $S_k$ remain grouped together, and the OFDM symbols $S_k$ are transmitted in succession. En other words, samples $S_0[0]$ to $S_0[127]$ of OFDM symbol $S_0$ are transmitted before samples $S_1[0]$ to $S_1[127]$ of OFDM symbol $S_1$, which are transmitted before samples $S_2[0]$ to $S_2[127]$ of OFDM symbol $S_2$.

TABLE II

GROUPING OF SAMPLES $S_k[i]$ IN THE TIME DOMAIN OF A PRIOR-ART OFDM SIGNAL

| | OFDM Symbol $S_0$ | | | | | OFDM Symbol $S_1$ | | | | | OFDM Symbol $S_2$ | | | | |
|---|---|---|---|---|---|---|---|---|---|---|---|---|---|---|---|
| | | | | | | Sample Index | | | | | | | | | |
| | 0 | 1 | 2 | 3 | ... 127 | 128 | 129 | 130 | 131 | ... 255 | 256 | 257 | 258 | 259 | ... 383 |
| Transmitted Data | $S_0[0]$ | $S_0[1]$ | $S_0[2]$ | $S_0[3]$ | ... $S_0[127]$ | $S_1[0]$ | $S_1[1]$ | $S_1[2]$ | $S_1[3]$ | ... $S_1[127]$ | $S_2[0]$ | $S_2[1]$ | $S_2[2]$ | $S_2[3]$ | ... $S_2[127]$ |

FIG. 2 shows a frequency-domain representation of prior-art OFDM symbol $S_0$ described in the example above. Each subcarrier, represented by a single waveform, is assigned one data symbol a[n]. Additionally, note that the subcarriers are spaced apart so that the peak of each subcarrier corresponds to a zero level of every other subcarrier. This is representative of the orthogonal nature of the set of subcarriers.

FIG. 3 shows a simplified block diagram of one implementation of a prior-art OFDM receiver 300, which reverses the operations performed by OFDM transmitter 100. Receiver 300 receives analog OFDM signals and extracts the original digital data. Extraction occurs through sequential steps of matched filtering 302, analog-to-digital conversion (ADC) 304, cyclic prefix removal 306, fast Fourier transform (FFT) processing 308, and data symbol demapping 310.

First, the received OFDM signal is down-converted into a baseband analog signal at the receiver's RF front end. The baseband analog signal is filtered by matched filtering block 302 and converted to digital format by ADC 304. Next, synchronization and channel estimation may be performed (not shown). Then, cyclic prefix removal block 306 removes the cyclic prefixes from the time-domain OFDM symbols $S_k$.

FFT 308 receives digital OFDM symbols $S_k$ and extracts the N subcarriers from each to obtain data symbols a[n], according to Equation (2) as follows:

$$a[n] = \sum_{i=0}^{N-1} S_k[i] e^{-j\frac{2\pi}{N}ni} w[n] \quad (2)$$

Finally, data symbols a[n] are demapped into the original binary bits using data symbol demapping block 310 which demodulates the data symbols in accordance with the modulation technique employed by data symbol mapping 102 of FIG. 1.

SUMMARY OF THE INVENTION

In one embodiment, the present invention is a method for modulating a set of data symbols into a combined modulated symbol. The method comprises: (1) dividing the set of data symbols into M groups of data symbols where M is greater than 1, (2) transforming each group of data symbols into a time-domain subsymbol, and (3) combining the M time-domain subsymbols to form the combined modulated symbol. The transformation of each group of data symbols is based on a set of subcarriers, of which only a subset of the subcarriers is modulated by the group of data symbols. Furthermore, each data symbol in each group modulates a different subcarrier in a corresponding subset of the subcarriers, and no two subsets of subcarriers have a subcarrier in common.

In another embodiment, the present invention is an apparatus comprising a transmitter adapted to modulate a set of data symbols into a combined modulated symbol. The transmitter comprises: (1) a data symbol grouper adapted to divide the set of data symbols into M groups of data symbols, where M is greater than 1, (2) one or more transforms adapted to transform each group of data symbols into a time-domain subsymbol, and (3) a subsymbol combiner adapted to combine the M time-domain subsymbols to form the combined modulated symbol. The transformation of each group of data symbols is based on a set of subcarriers, of which only a subset of the subcarriers is modulated by the group of data symbols. Furthermore, each data symbol in each group modulates a different subcarrier in a corresponding subset of the subcarriers, and no two subsets of subcarriers have a subcarrier in common.

In a further embodiment, the present invention is a method for demodulating a combined modulated symbol into a set of demodulated data symbols. The method comprises: (1) separating the combined modulated symbol into M time-domain subsymbols, where M is greater than 1, (2) transforming each time-domain subsymbol into a group of demodulated data symbols, and (3) de-grouping the M groups of demodulated data symbols to generate the set of demodulated data symbols. The transformation of each time-domain subsymbol is based on a set of subcarriers, of which only a subset of the subcarriers is modulated by the group of demodulated data symbols. Furthermore, each demodulated data symbol in each group modulates a different subcarrier in a corresponding subset of the subcarriers, and no two subsets of subcarriers have a subcarrier in common.

In yet a further embodiment, the present invention is an apparatus comprising a receiver for demodulating a combined modulated symbol into a set of demodulated data symbols. The receiver comprises: (1) a subsymbol separator adapted to separate the combined modulated symbol into M time-domain subsymbols, where M is greater than 1, (2) one or more transforms adapted to transform each time-domain subsymbol into a group of demodulated data symbols, and (3) a data symbol de-grouper adapted to de-group the M groups of demodulated data symbols to generate the set of demodulated data symbols. The transformation of each time-domain subsymbol is based on a set of subcarriers, of which only a subset of the subcarriers is modulated by the group of demodulated data symbols. Furthermore, each demodulated data symbol in each group modulates a different subcarrier in a corresponding subset of the subcarriers, and no two subsets of subcarriers have a subcarrier in common.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Certain embodiments of the present invention relate to combined-OFDM methods and apparatuses for practicing these methods. In one such embodiment, data symbols a[n] are divided into groups, where each group is converted into an OFDM subsymbol using an inverse fast Fourier transform. Then, multiple OFDM subsymbols are combined to produce a combined-OFDM symbol.

Figure 4:
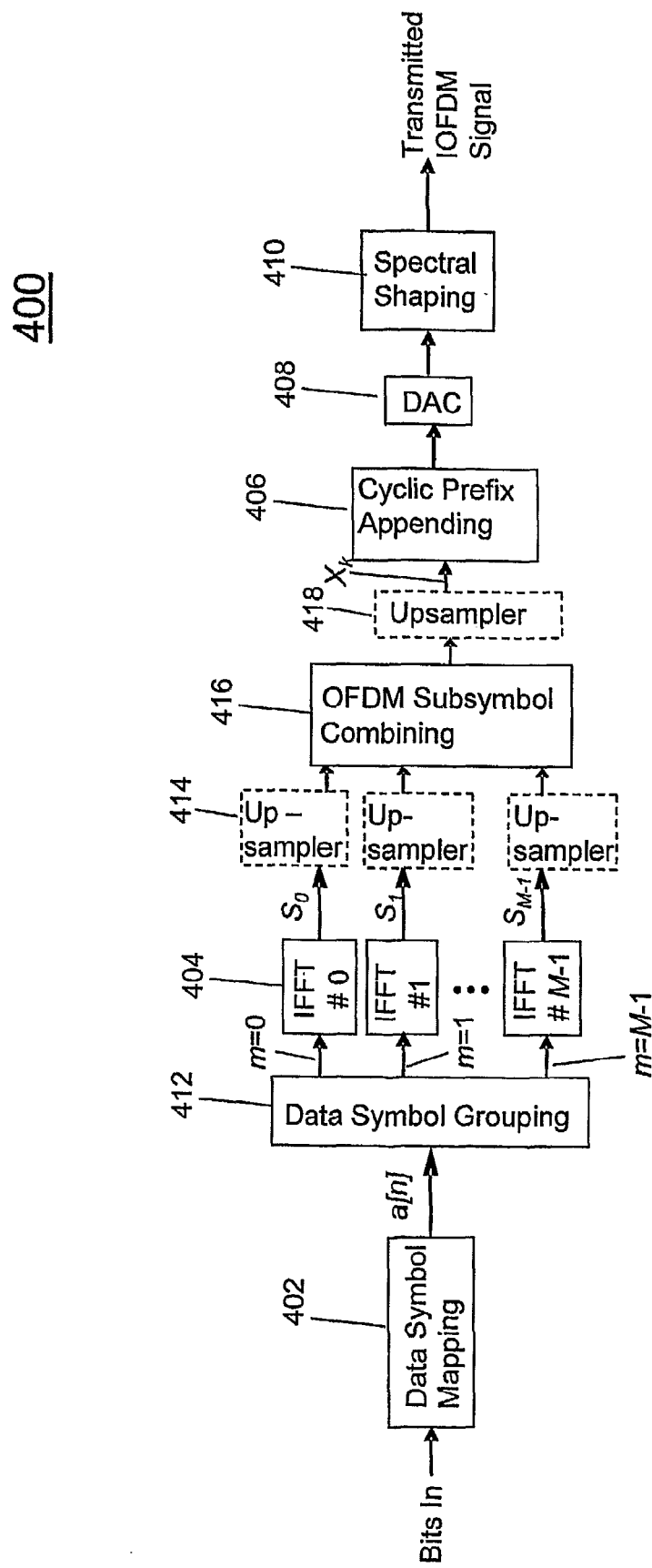
FIG. 4 shows a simplified block diagram of a combined-OFDM transmitter according to one embodiment of the present invention.

FIG. 4 shows a simplified block diagram of a combined-OFDM transmitter 400 according to one embodiment of the present invention. Transmitter 400 receives digital input data and converts the data into analog combined-OFDM signals for transmission. Conversion of the data occurs through sequential steps of data symbol mapping 402, data symbol grouping 412, inverse fast Fourier transform (IFFT) processing 404, OFDM subsymbol combining 416, cyclic prefix appending 406, digital-to-analog conversion (DAC) 408, and spectral shaping 410.

Figure 1:
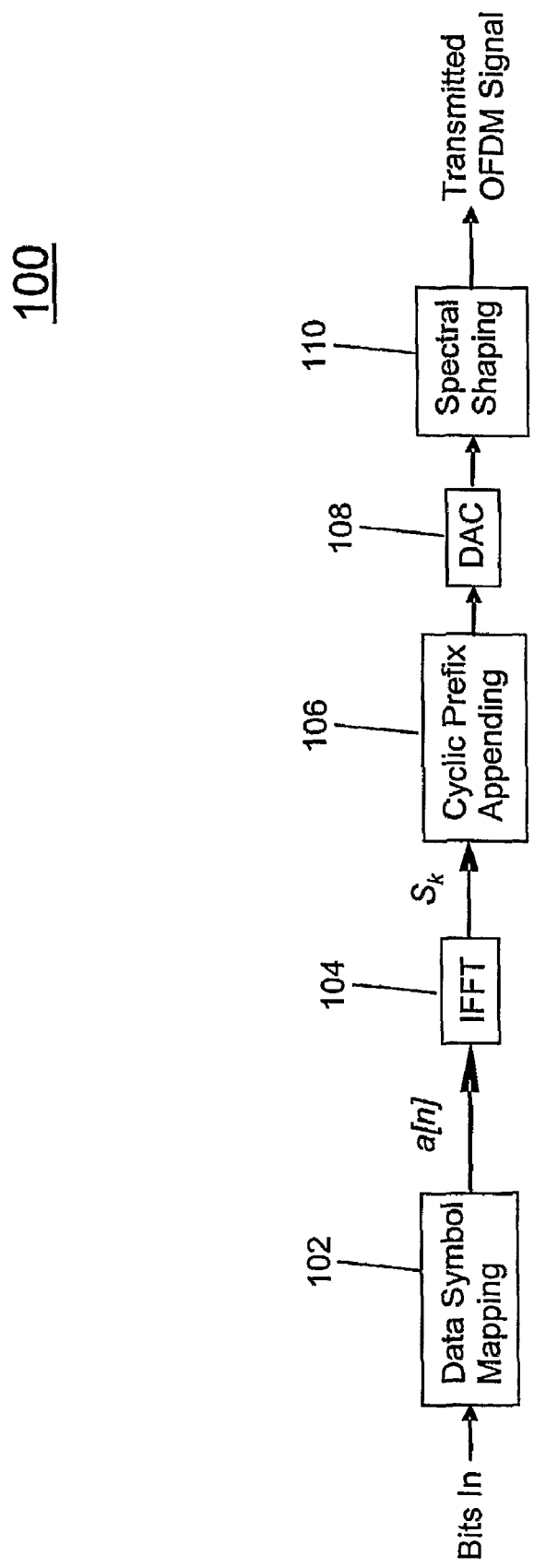
FIG. 1 shows a simplified block diagram of one possible implementation of a prior-art OFDM transmitter.
Figure 2:
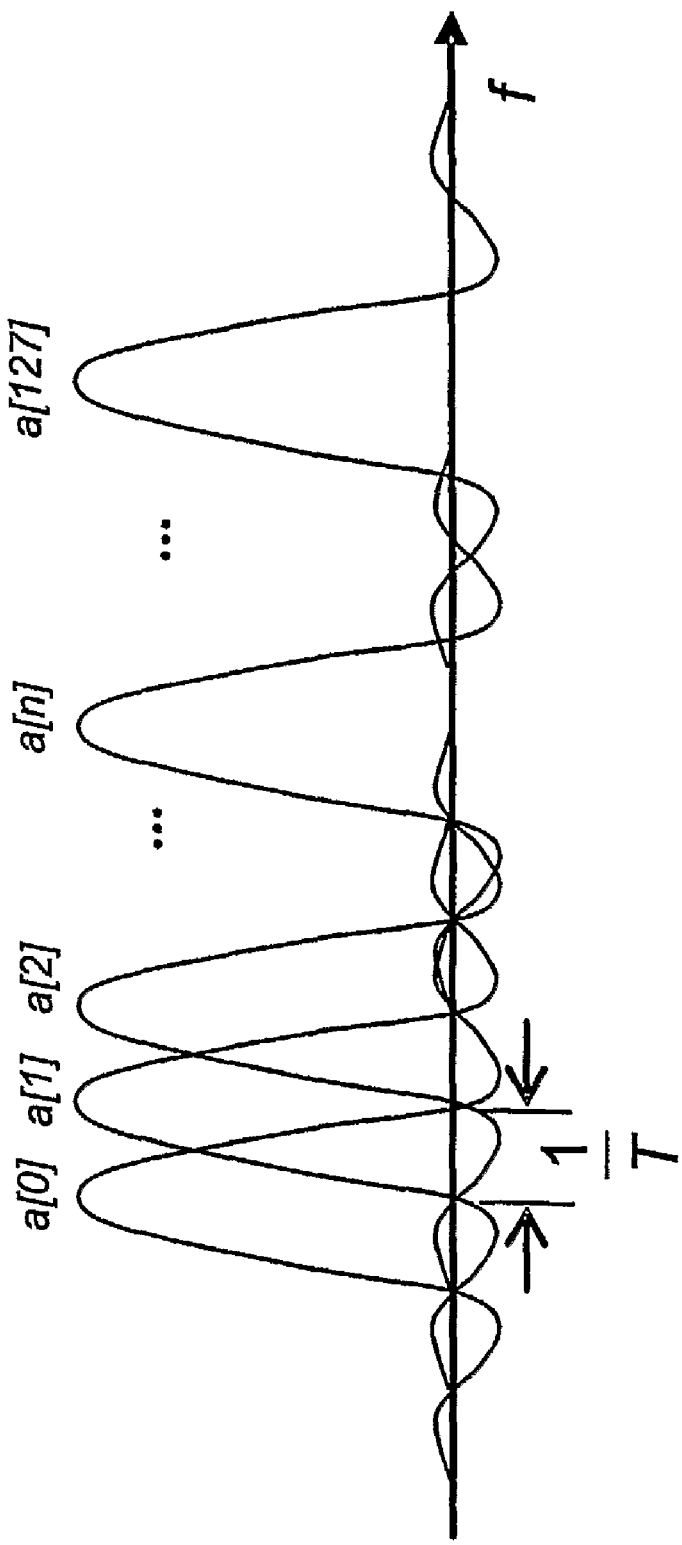
FIG. 2 graphically illustrates a frequency-domain representation of an exemplary prior-art OFDM signal.

In prior-art transmitter 100 of FIG. 1, IFFT 104 receives a set of N data symbols a[n] from data symbol mapping block 102 and assigns the N data symbols a[n] to N subcarriers. The N data symbol a[n] and subcarrier pairs are then converted from frequency-domain representations into a time-domain OFDM symbol $S_k$. According to the embodiment of FIG. 4, transmitter 400 has data symbol mapping block 402, which performs operations analogous to those of data symbol mapping block 102 of prior-art transmitter 100. Additionally, transmitter 400 has M instances of IFFT 404, M>1, each instance utilizing N subcarriers. A set of N data symbols a[n] is divided into M groups by data symbol grouping 412. Each group m, numbered consecutively from 0 to M−1, is then transmitted to a separate instance of IFFT 404. Division of data symbols a[n] amongst the M groups is performed according to a grouping pattern. This pattern is described further in the example below.

Each instance of IFFT 404 receives one group m of N/M data symbols a[n] and assigns the N/M data symbols to the N subcarriers. Since the number N/M of data symbols a[n] in each group in is smaller than the number N of subcarriers per IFFT 404, not every subcarrier is assigned a data symbol a[n] for modulation. Thus, the number $N_m$ of modulated subcarriers per IFFT 404 is equal to N/M. Each IFFT 404 then converts the N subcarriers (i.e. the $N_m$ modulated subcarriers and (N−$N_m$) unmodulated subcarriers) from frequency-domain representations into a time-domain OFDM subsymbol $S_m$. As such, M instances of IFFT 404 produce M time-domain OFDM subsymbols $S_m$, each subsymbol $S_m$ consisting of N samples. The discrete model for each OFDM subsymbol $S_m$ may be expressed by Equation (3) as follows:

$$S_m[i] = \sum_{n=0}^{N_m-1} a_m[n] c_m[i, n] \quad (3)$$

where i=0, . . . , N−1, $a_m[n]$ are the data symbols in OFDM subsymbol m, and the finite length complex exponential sequence for each group of modulated subcarriers $N_m$ is $c_m[i, n] = e^{j\frac{2\pi}{N}(m+Mn)i} w[i]$.

Note that this grouping sequence varies depending on the grouping pattern used.

Next, OFDM subsymbol combining 416 receives M OFDM subsymbols, each containing N samples, from the M instances of IFFT 404. According to this embodiment, the (N×M) total samples are combined using an interleaving pattern, to create one type of combined-OFDM symbol, herein referred to as an interleaved-OFDM (IOFDM) symbol. This interleaving pattern is discussed further in the example below. The resulting IOFDM symbol is expressed in Equation (4) below:

$$X_k(q) = \sum_{m=0}^{M-1} \sum_{i=0}^{N-1} S_m[i] \delta[q - m - iM] \quad (4)$$

where δ[.] denotes a unit impulse sequence. This unit impulse sequence varies depending on the OFDM subsymbol combining (e.g., interleaving) pattern used.

The IOFDM symbols $X_k$ are then prepared for transmission. Similar to prior-art transmitter 100 of FIG. 1, transmitter 400 performs cyclic prefix appending 406, digital-to-analog conversion (DAC) 408, and spectral shaping 410.

As an example of an IOFDM signal according to this embodiment, assume that data symbol grouping block 412 receives 128 data symbols a[n], n=0, . . . , 127, and each instance of IFFT 404 employs N=128 subcarriers. Also, assume that the number M of groups is chosen to be 4. The 128 data symbols a[n] may be divided into M groups by data symbol grouping block 412 as shown in Table III.

TABLE III

GROUPING OF DATA SYMBOLS a[n] IN
THE FREQUENCY DOMAIN OF AN IOFDM SIGNAL
ACCORDING TO ONE EMBODIMENT

| Subcarrier Index | 0 | 1 | 2 | 3 | 4 | ... | 127 |
|---|---|---|---|---|---|---|---|
| OFDM Subsymbol 0 ($S_0$) | a[0] | | | | a[4] | ... | |
| OFDM Subsymbol 1 ($S_1$) | | a[1] | | | | ... | |
| OFDM Subsymbol 2 ($S_2$) | | | a[2] | | | ... | |
| OFDM Subsymbol 3 ($S_3$) | | | | a[3] | | ... | a[127] |

According to this grouping pattern, the first data symbol a[0] is assigned to subcarrier 0 in OFDM subsymbol $S_0$, the second data symbol a[1] is assigned to subcarrier 1 in the second OFDM subsymbol $S_1$, the third data symbol a[2] is assigned to subcarrier 2 in the third OFDM subsymbol $S_2$, and the fourth data symbol a[3] is assigned to subcarrier 3 in the fourth OFDM subsymbol $S_3$. This grouping pattern is continued beginning with the fifth data symbol a[4] being assigned to subcarrier 4 in the first OFDM subsymbol $S_0$ and concluding with the last data symbol a[127] being assigned to subcarrier 127 in the fourth OFDM subsymbol $S_3$.

Figure 5:
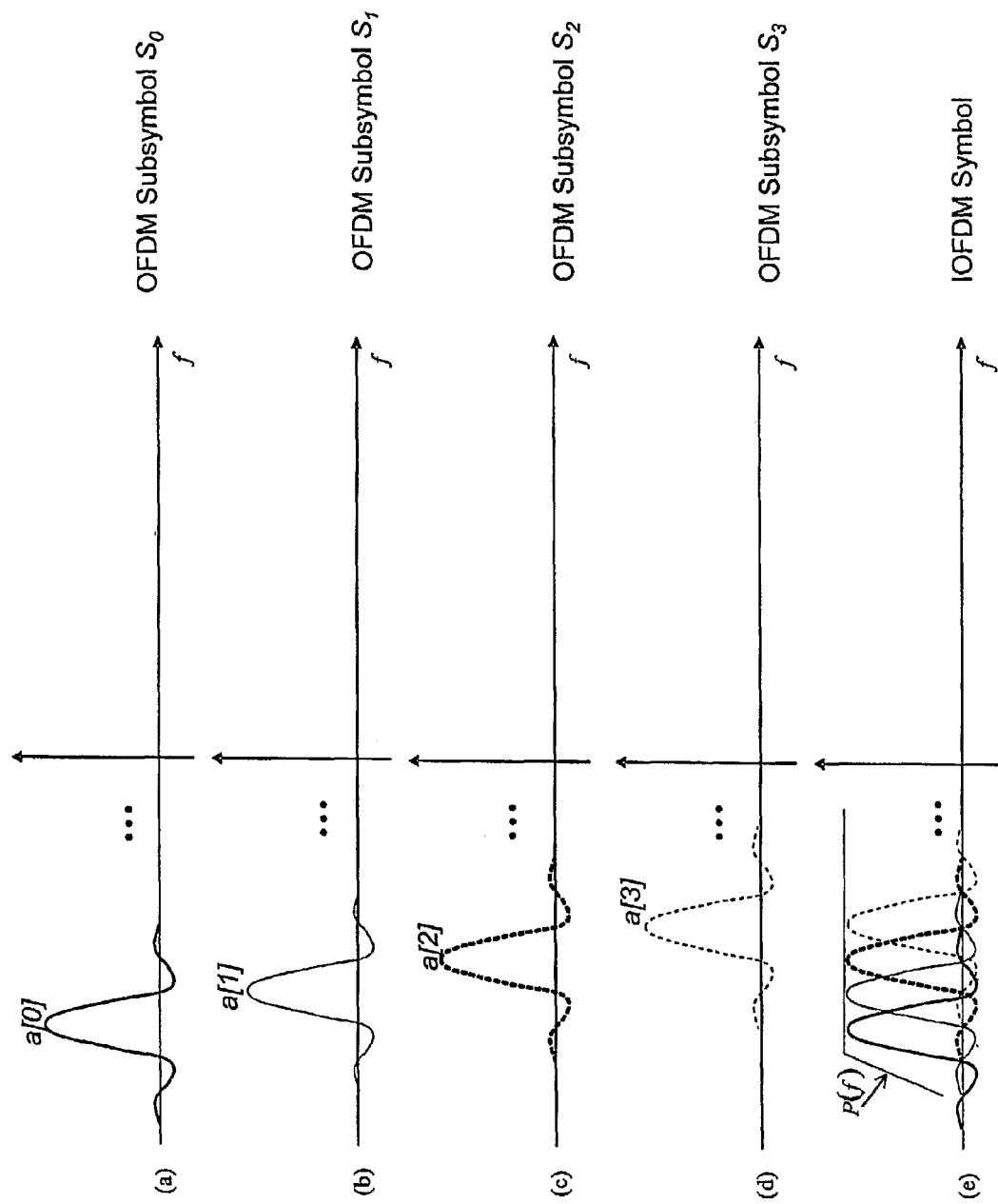
FIG. 5 graphically illustrates one implementation of a grouping pattern of frequency-domain data symbols according to one embodiment of the present invention.

FIG. 5 further demonstrates the data symbol grouping pattern described in the example above. This frequency-domain representation shows each modulated subcarrier $N_m$, represented by a single waveform. FIGS. 5 (a), (b), (c), and (d) show the first modulated subcarriers of OFDM subsymbols $S_0$, $S_1$, $S_2$, and $S_3$, respectively. FIG. 5 (e) shows the frequency-domain representation of the corresponding IOFDM symbol. Note that P(f) is the frequency response of spectral shaping block 410.

After conversion from frequency-domain representations into time-domain OFDM subsymbols $S_m$, by the 4 instances of IFFT 404, samples $S_m[i]$ may be interleaved as shown in Table IV to produce an IOFDM symbol $X_k$.

TABLE IV

GROUPING OF SAMPLES $S_m[i]$ IN THE TIME DOMAIN ACCORDING TO ONE EMBODIMENT

IOFDM Symbol $X_k(q)$, q = 0, . . . , 511
Sample Index q

| | 0 | 1 | 2 | 3 | 4 | 5 | 6 | 7 | 8 | 9 | 10 | 11 | ... | 508 | 509 | 510 | 511 |
|---|---|---|---|---|---|---|---|---|---|---|---|---|---|---|---|---|---|
| Transmitted Data | $S_0[0]$ | $S_1[0]$ | $S_2[0]$ | $S_3[0]$ | $S_0[1]$ | $S_1[1]$ | $S_2[1]$ | $S_3[1]$ | $S_0[2]$ | $S_1[2]$ | $S_2[2]$ | $S_3[2]$ | ... | $S_0[127]$ | $S_1[127]$ | $S_2[127]$ | $S_3[127]$ |

Note that one sample $S_m[i]$ is created for each subcarrier, even if the subcarrier is not assigned a data symbol a[n]. In this interleaving pattern, sample $S_0[0]$, is followed by samples $S_1[0]$, $S_2[0]$, and $S_3[0]$. Following $S_3[0]$, the pattern continues beginning with $S_0[1]$ and followed by $S_1[1]$, $S_2[1]$, and $S_3[1]$. This interleaving pattern is repeated for all samples $S_m[i]$.

Figure 6:
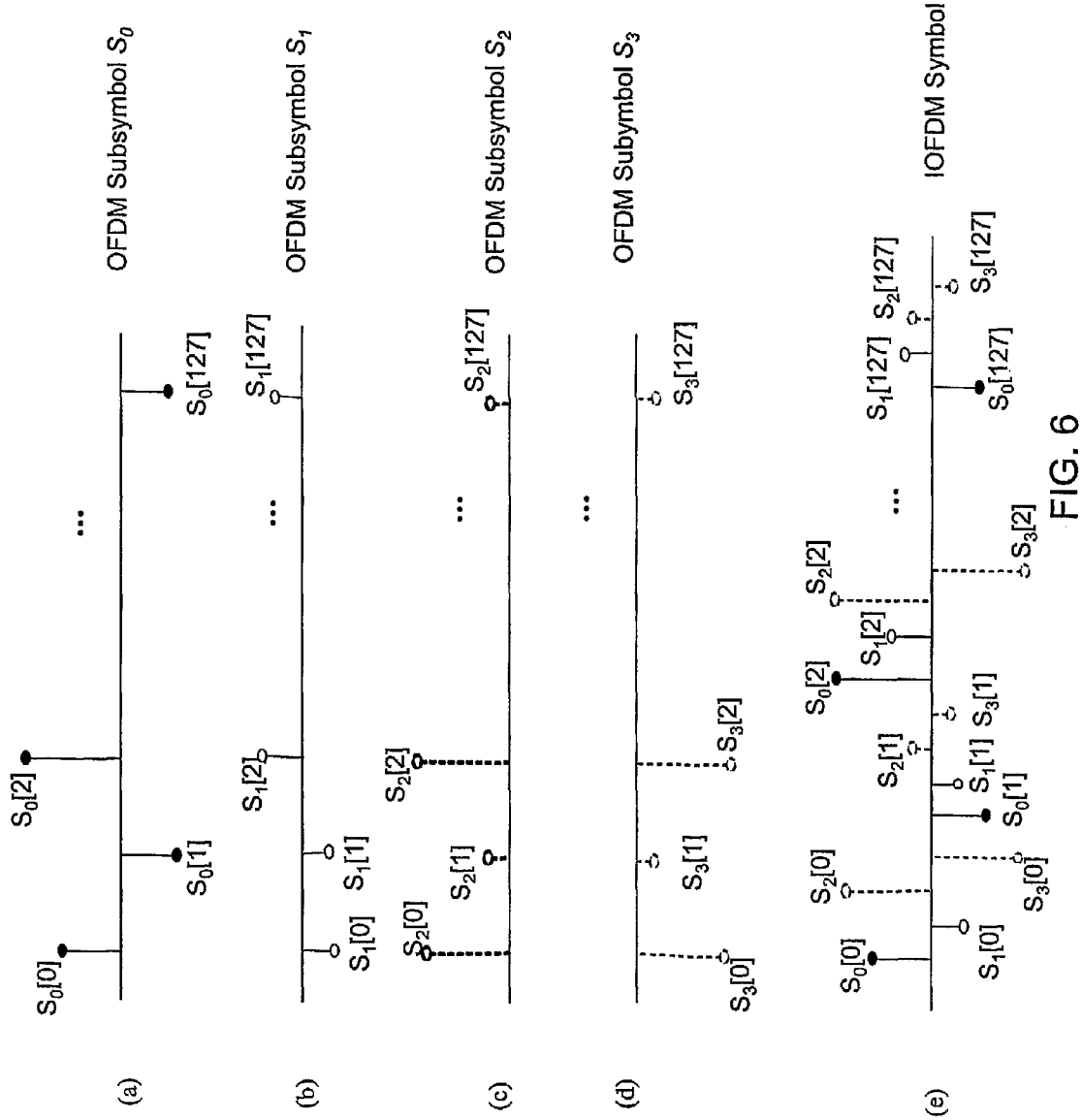
FIG. 6 graphically illustrates one implementation of an interleaving pattern of time-domain samples according to one embodiment of the present invention.

FIG. 6 further demonstrates the interleaving pattern described in the example above. FIGS. 6 (a), (b), (c) and (d) represent OFDM subsymbols $S_0$, $S_1$, $S_2$, and $S_3$, respectively. FIG. 6 (e) represents the interleaved OFDM symbol $X_k$.

According to the exemplary IOFDM symbol given above, 512 samples $X_k[q]$, where q=0, . . . , 511, are transmitted for each set of 128 data symbols a[n]. This is in contrast to the example provided for prior-art OFDM transmitter 100 in the background section, where each set of 128 data symbols is transmitted using 128 OFDM samples. Thus, the IOFDM symbol duration of this example is 4 times longer than the OFDM symbol duration of the corresponding prior-art example. On the other hand, an IOFDM symbol $X_k$ is more robust against noise effects during transmission than the corresponding prior-art OFDM symbol $S_k$. In addition, the sample period (T/N) of the IOFDM symbol $X_k$ is the same as the sample period of the prior-art OFDM symbol $S_k$. Thus, the bandwidth of the IOFDM symbol $X_k$ is the same as that of the OFDM symbol $S_k$.

Figure 7:
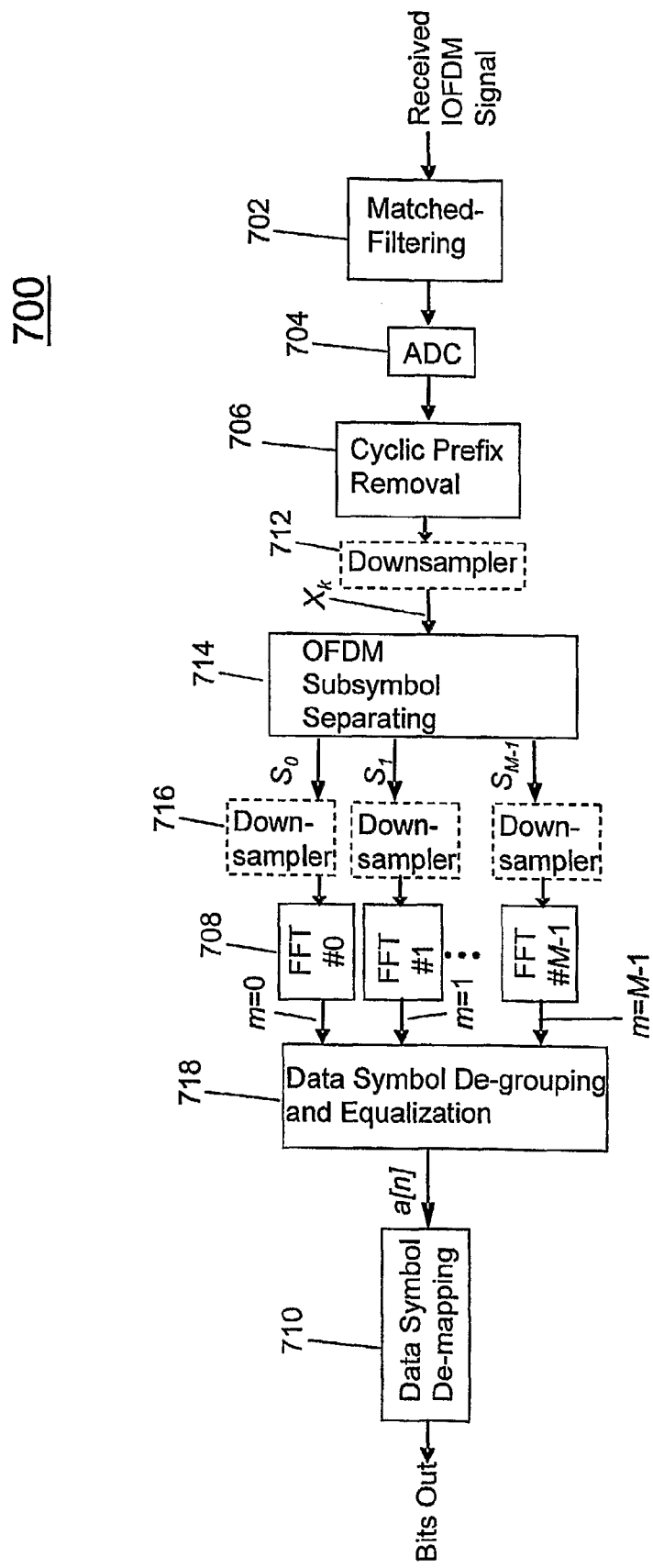
FIG. 7 shows a simplified block diagram of a combined-OFDM receiver according to one embodiment of the present invention.

FIG. 7 shows a simplified block diagram of one implementation of a combined-OFDM receiver 700, which reverses the operations performed by combined-OFDM transmitter 400. Receiver 700 receives analog combined-OFDM signals and extracts the original digital data. Extraction occurs through sequential steps of matched filtering 702, analog-to-digital conversion (ADC) 704, cyclic prefix removal 706, OFDM subsymbol separating 714, fast Fourier transform (FFT) processing 708, data symbol de-grouping and equalization 718, and data symbol de-mapping 710.

Figure 3:
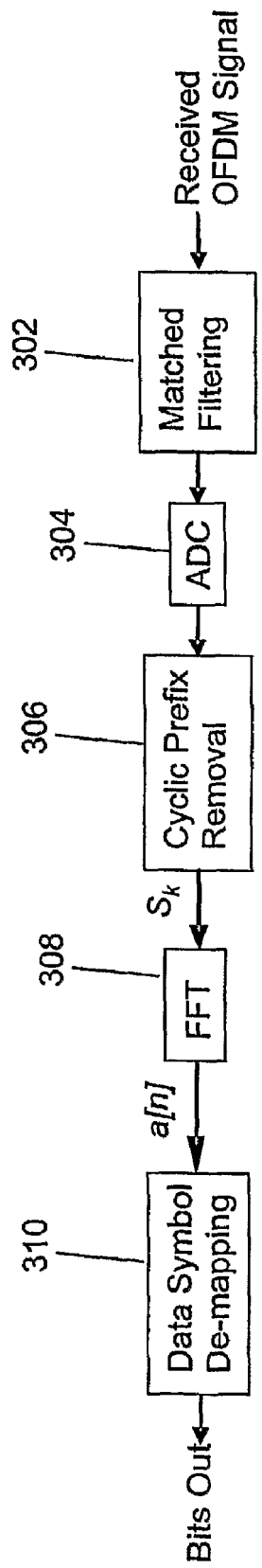
FIG. 3 shows a simplified block diagram of one possible implementation of a prior-art OFDM receiver.

First, receiver 700 down-converts the received signal into a baseband analog signal at the receiver's RF front end. Then, similar to prior-art receiver 300 of FIG. 3, receiver 700 performs matched filtering 702, analog-to-digital conversion ADC 704, and cyclic prefix removal 706. Additionally, synchronization and channel estimation may be performed (not shown).

OFDM subsymbol separating block 714 separates (e.g., deinterleaves) the digital IOFDM symbols $X_k$ to recover the M OFDM subsymbols $S_m$. The M OFDM subsymbols $S_m$ are subsequently transmitted to the M instances of FFT 708. Each instance of FFT 708 extracts N subcarriers from the corresponding OFDM subsymbol $S_m$ to obtain the corresponding group in of data symbols a[n]. The M groups of data symbols a[n] are then equalized and de-grouped by data symbol de-grouping and equalization block 718. Finally, data symbols a[n] are de-mapped into the original binary bits using conventional data symbol de-mapping block 710.

Various embodiments of the present invention may be envisioned in which alternative grouping patterns are employed.

In the IOFDM example above, data symbols a[n] were grouped using an interleaving pattern. Another grouping pattern using interleaving may be employed for the above IOFDM example in which the first two data symbols (a[0] and a[1]) are assigned to subcarriers 0 and 1 in OFDM subsymbol $S_0$, the third and fourth data symbols (a[2] and a[3]) are assigned to subcarriers 2 and 3 in OFDM subsymbol $S_1$, the fifth and sixth data symbols (a[4] and a[5]) are assigned to subcarriers 4 and 5 in OFDM subsymbol $S_2$, and the seventh and eighth data symbols (a[6] and a[7]) are assigned to subcarriers 6 and 7 in OFDM subsymbol $S_3$. This process is then continued beginning with the ninth and tenth data symbols a[8] and a[9] being assigned to subcarriers 8 and 9 in OFDM subsymbol $S_0$ and concluding with data symbols a[126] and a[127] being assigned to subcarriers 126 and 127 in OFDM subsymbol $S_3$. A vast number of alternative grouping patterns may be envisioned within the scope of this invention.

Various embodiments of the present invention may also be envisioned in which alternative combining patterns using interleaving are employed. In one such alternative to the IOFDM example above, OFDM subsymbol combining block 416 may assign two consecutive samples $S_m[i]$ to IOFDM symbol X(k) at a time. In other words, OFDM subsymbol combining block 416 may assign $S_0[0]$ and $S_0[1]$, followed by $S_1[0]$ and $S_1[1]$, followed by $S_2[0]$ and $S_2[1]$, followed by $S_3[0]$ and $S_3[1]$ to IOFDM symbol X(k). This process is then repeated beginning with $S_0[2]$ and ending with $S_3[127]$. A vast number of alternative combining patterns using interleaving may be envisioned within the scope of this invention.

Furthermore, the above mentioned examples demonstrate one type of combined-OFDM symbol, referred to as an IOFDM symbol. In another type of combined-OFDM symbol, subsymbols $S_k$ can be appended to each other without interleaving, such that, samples $S_0[0]$ to $S_0[127]$ of subsymbol $S_0$ are followed by samples $S_1[0]$ to $S_1[127]$ of subsymbol $S_1$, which are followed by samples $S_2[0]$ to $S_2[127]$ of subsymbol $S_2$, which are followed by samples $S_3[0]$ to $S_3[127]$ of subsymbol $S_3$. The order in which subsymbols $S_k$ are appended may also vary.

Figure 8:
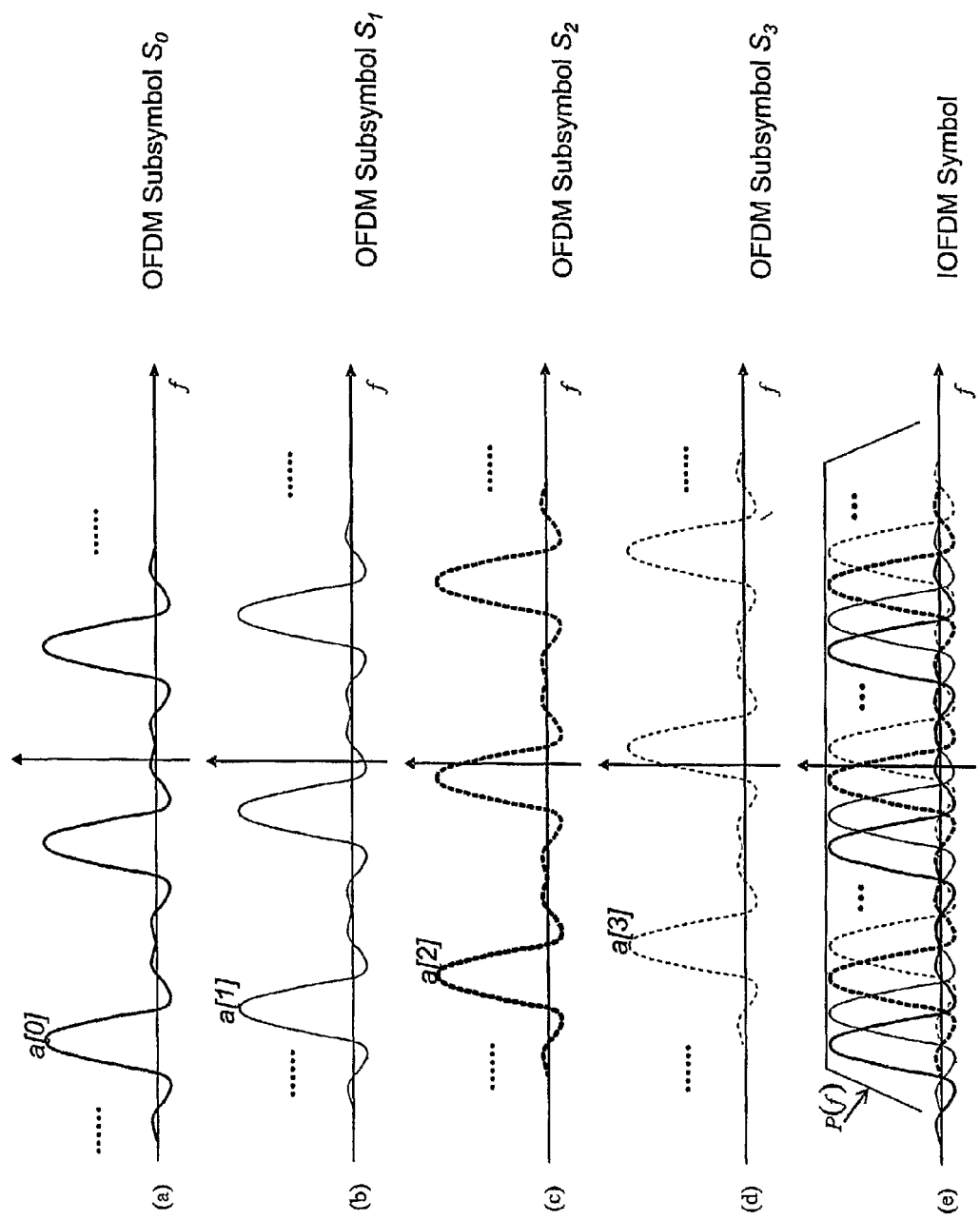
FIG. 8 graphically illustrates the imaging that occurs in the frequency domain of an upsampled combined-OFDM signal according to one embodiment of the present invention.

Further embodiments of the present invention may be envisioned in which the combined-OFDM symbol duration is the same as the corresponding prior-art OFDM symbol duration. In such embodiments, OFDM subsymbols $S_m$ or combined-OFDM symbols $X_k$ are upsampled by upsamplers 414 or 418, respectively, to increase the data rate. For instance, in the IOFDM example above, the 128 samples $S_m[i]$ may be upsampled by 4 (i.e., upsampled by M), so that the total number of modulated samples transmitted per IOFDM symbol increases from 128 to 512. As a result of upsampling, imaging in DAC 408 produces a larger signal bandwidth. The resulting upsampled IOFDM signal may be represented by Equation (5) as follows:

$$x(t) = \sum_q x[q]\delta(t-qT_C) * p(t) = \sum_{m=0}^{M-1}\sum_{i=0}^{N-1} S_m[i]p(t-mT_C-iMT_C)$$

where p(t) is the impulse response of the spectral shaping filter, and $$T_C = \frac{T}{MN}$$

is the new sample period. FIG. 8 graphically demonstrates this imaging in the frequency domain. Note that the modulated subcarriers are repeated at higher frequencies. This phenomenon increases the overall signal bandwidth. Additionally, in order to accommodate upsampling, receiver 700 has downsamplers 712 or 716, which downsample either the combined-OFDM symbols $X_k$ or the OFDM subsymbols $S_m$ of the received signal, respectively.

The present invention has been described using a number of data symbols a[n] that is equal to the number N of subcarriers; however, the present invention is not so limited. The number of data symbols a[n] may be fewer than the number N of subcarriers. Therefore, the number $N_m$ of subcarriers modulated with data symbols a[n] per IFFT 404 could be less than N/M. The excess unmodulated subcarriers could then be used for other purposes such as implementation as guard channels or pilot channels.

Additional embodiments of the present invention may be envisioned in which the number M of groups varies. In the above-mentioned IOFDM example, the number M of groups (i.e., 4) was chosen based on the number N (i.e., 128) of subcarriers such that the number $N_m$ of modulated subcarriers per group N/M is an integer (i.e., 32). While it is preferred that the number of data symbols per group $N_m$ be an integer, it is not necessary. For example, the number M of groups could be 3, in which case each group would not necessarily have the same number of data symbols a[n]. Additionally, by increasing the number M of groups, and employing upsampling, the width of the overall frequency spectrum is increased. Selecting a number M of groups that is equal to the number N of subcarriers allows for the greatest possible spectrum spreading. Alternatively, as the number M of groups is decreased, the frequency spectrum width is decreased. Selecting the number M of groups such that M=1, results in the production of a prior-art OFDM signal. Combined OFDM, therefore, provides a means to construct a variable spreading ratio system according to different applications and/or channel conditions. This spectrum spreading ability allows combined OFDM to be suitable for use in ultra-wideband (UWB) applications. Additionally, due to the wider spectrum of the combined-OFDM signal, lower power operation can be achieved, thereby easing issues of interference compliance.

In yet other embodiments, the number of IFFT blocks in transmitter 400 and FFT blocks in receiver 700 may vary. For instance, in the above-mentioned IOFDM example, transmitter 400 might have only one shared IFFT block that receives the M groups of data symbols a[n] in succession and converts the M groups in succession into M subsymbols $S_m$ in a time-multiplexed manner.

Other elements of OFDM are supported by this invention. For example, this invention may be implemented using coded OFDM (COFDM). Additionally, piconet channelization methods such as code division multiple access (CDMA) and frequency division multiple access (FDMA) can be used in conjunction with combined OFDM so that multi-piconet performance can be improved.

The present invention has been described as a transmitter and a receiver; however, the present invention may also be implemented as a transceiver. Furthermore, receivers, transmitters, and transceivers may be implemented in a wide variety of applications, including any suitable consumer product or other suitable apparatus. Such apparatuses include devices such as cellular phones and cellular phone base stations.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims. For example, various equalization techniques commonly known in the art may be employed in receiver 700. As another example, methods other than cyclic prefix appending might be employed, including use of a zero pad.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for modulating a set of data symbols into a combined modulated symbol, the method comprising:
   (a) dividing the set of data symbols into M groups of data symbols, M>1;
   (b) transforming each group of data symbols into a time-domain subsymbol to produce M time-domain subsymbols, wherein:
      the transformation of each group of data symbols is based on a set of subcarriers, of which only a subset of the set of subcarriers is modulated by the group of data symbols;
      each data symbol in each group modulates a different subcarrier in a corresponding subset of the set of subcarriers;
      no two subsets of the set of subcarriers have a subcarrier in common; and
      each transformation transforms the set of subcarriers; and
   (c) combining the M time-domain subsymbols to form the combined modulated symbol, wherein at least one step of the method is performed by at least on apparaus.

2. The invention of claim 1, wherein the total number of subcarriers in the M subsets of subcarriers is equal to the number of subcarriers in the set of subcarriers.

3. The invention of claim 1, wherein step (b) comprises, for each subset of modulated subcarriers, transforming both the subset of modulated subcarriers and one or more unmodulated subcarriers to form the corresponding time-domain subsymbol.

4. The invention of claim 3, wherein for each group of data symbols, the sum of (1) the number of the modulated subcarriers and (2) the number of the one or more unmodulated subcarriers is equal to the total number of subcarriers in the set.

5. The invention of claim 1, wherein:
   each time-domain subsymbol is represented by a plurality of time-domain samples; and
   step (c) comprises interleaving the time-domain samples of the M subsymbols to form a sequence of interleaved time-domain samples for the combined modulated symbol.

6. The invention of claim 1, wherein step (c) comprises generating an upsampled combined modulated symbol by upsampling either (i) the M time-domain subsymbols prior to the combining or (ii) the combined modulated symbol after the combining.

7. The invention of claim 1, wherein:
   the transformation is an inverse fast Fourier transformation (IFFT);
   each time-domain subsymbol is an OFDM subsymbol; and
   the combined modulated symbol is a combined OFDM symbol.

8. Apparatus comprising a transmitter for modulating a set of data symbols into a combined modulated symbol, the transmitter comprising:
   a data symbol grouper adapted to divide the set of data symbols into M groups of data symbols, M>1;
   one or more transforms adapted to transform each group of data symbols into a time-domain subsymbol, wherein:
      the transformation of each group of data symbols is based on a set of subcarriers, of which only a subset of the set of subcarriers is modulated by the group of data symbols;
      each data symbol in each group modulates a different subcarrier in a corresponding subset of the set of subcarriers;
      no two subsets of the set of subcarriers have a subcarrier in common; and
      each transformation transforms the set of subcarriers; and
   a subsymbol combiner adapted to combine the M time-domain subsymbols to form the combined modulated symbol.

9. The invention of claim 8, the one or more transforms comprise two or more transforms, each transform adapted to transform one or more groups of data symbols into one or more time-domain subsymbols.

10. The invention of claim 8, the one or more transforms comprise a shared transform adapted to transform two or more groups of data symbols into two or more time-domain subsymbols in a time-multiplexed manner.

11. The invention of claim 8, wherein:
    each time-domain subsymbol is represented by a plurality of time-domain samples; and
    the subsymbol combiner is adapted to interleave the time-domain samples of the M subsymbols to form a sequence of interleaved time-domain samples for the combined modulated symbol.

12. The invention of claim 8, wherein:
the one or more transforms are adapted to implement one or more IFFTs;
each time-domain subsymbol is an OFDM subsymbol; and
the combined modulated symbol is a combined OFDM symbol.

13. The invention of claim 8, further comprising one or more upsamplers adapted to generate an upsampled combined modulated symbol by upsampling either (i) the M time-domain subsymbols prior to the combining or (ii) the combined modulated symbol after the combining.

14. A method for demodulating a combined modulated symbol into a set of demodulated data symbols, the method comprising:
(a) separating the combined modulated symbol into M time-domain subsymbols, M>1;
(b) transforming each time-domain subsymbol into a group of demodulated data symbols, wherein:
the transformation of each time-domain subsymbol is based on a set of subcarriers, of which only a subset of the set of subcarriers is modulated by the group of demodulated data symbols;
each demodulated data symbol in each group modulates a different subcarrier in a corresponding subset of the set of subcarriers;
no two subsets of the set of subcarriers have a subcarrier in common; and
each transformation transforms the set of subcarriers; and
(c) de-grouping the M groups of demodulated data symbols to generate the set of demodulated data symbols, wherein at least one step of the method is performed by at least one apparatus.

15. The invention of claim 14, wherein:
the combined modulated symbol comprises a sequence of interleaved time-domain samples; and
step (a) comprises de-interleaving the interleaved time-domain samples to obtain the M time-domain subsymbols.

16. The invention of claim 14, wherein the total number of subcarriers in the M subsets of subcarriers is equal to the number of subcarriers in the set of subcarriers.

17. The invention of claim 14, wherein step (b) comprises, for each subset of modulated subcarriers, transforming both the subset of modulated subcarriers and one or more unmodulated subcarriers to form the corresponding group of demodulated data symbols.

18. The invention of claim 17, wherein for each group of demodulated data symbols, the sum of (1) the number of the modulated subcarriers and (2) the number of the one or more unmodulated subcarriers is equal to the total number of subcarriers in the set.

19. The invention of claim 14, wherein step (a) comprises generating downsampled time-domain subsymbols by downsampling either (i) the combined modulated symbol prior to the separating or (ii) the M time-domain subsymbols after the separating.

20. The invention of claim 14, wherein:
the transformation is a fast Fourier transformation (FFT);
each time-domain subsymbol is an OFDM subsymbol; and
the combined modulated symbol is a combined OFDM symbol.

21. Apparatus comprising a receiver for demodulating a combined modulated symbol into a set of demodulated data symbols, the receiver comprising:

a subsymbol separator adapted to separate the combined modulated symbol into M time-domain subsymbols, M>1;
one or more transforms adapted to transform each time-domain subsymbol into a group of demodulated data symbols, wherein:
the transformation of each time-domain subsymbol is based on a set of subcarriers, of which only a subset of the set of subcarriers is modulated by the group of demodulated data symbols;
each demodulated data symbol in each group modulates a different subcarrier in a corresponding subset of the set of subcarriers;
no two subsets of the set of subcarriers have a subcarrier in common; and
each transformation transforms the set of subcarriers; and
a data symbol de-grouper adapted to de-group the M groups of demodulated data symbols to generate the set of demodulated data symbols.

22. The invention of claim 21, wherein:
the combined modulated symbol comprises a sequence of interleaved time-domain samples; and
the subsymbol separator is adapted to de-interleave the interleaved time-domain samples to obtain the M time-domain subsymbols.

23. The invention of claim 21, the one or more transforms comprise two or more transforms, each transform adapted to transform one or more time-domain subsymbols into one or more groups of demodulated data symbols.

24. The invention of claim 21, the one or more transforms comprise a shared transform adapted to transform two or more time-domain subsymbols into two or more groups of demodulated data symbols in a time-multiplexed manner.

25. The invention of claim 21, wherein:
the one or more transforms are adapted to implement one or more FFTs;
each time-domain subsymbol is an OFDM subsymbol; and
the combined modulated symbol is a combined OFDM symbol.

26. The invention of claim 21, further comprising one or more downsamplers adapted to generate downsampled time-domain subsymbols by downsampling either (i) the combined modulated symbol prior to the separating or (ii) the M time-domain subsymbols after the separating.

27. The invention of claim 1, wherein step (c) comprises combining the M time-domain subsymbols such that the combined modulated symbol has a duration that is longer than each time-domain subsymbol.

28. The invention of claim 8, wherein the subsymbol combiner is adapted to combine the M time-domain subsymbols such that the combined modulated symbol has a duration that is longer than each time-domain subsymbol.

29. The invention of claim 14, wherein step (a) comprises separating the combined modulated symbol into the M time-domain subsymbols such that each of the time-domain subsymbols has a duration that is shorter than the combined modulated symbol.

30. The invention of claim 21, wherein the subsymbol separator is adapted to separate the combined modulated symbol into the M time-domain subsymbols, such that each of the time-domain subsymbols has a duration that is shorter than the combined modulated symbol.

31. A method for modulating a set of data symbols into a combined modulated symbol, the method comprising:
(a) dividing the set of data symbols into M groups of data symbols, M>1;

(b) transforming each group of data symbols into a time-domain subsymbol to produce M time-domain subsymbols, wherein:

the transformation of each group of data symbols is based on a set of subcarriers, of which only a subset of the subcarriers is modulated by the group of data symbols;

each data symbol in each group modulates a different subcarrier in a corresponding subset of the subcarriers;

no two subsets of subcarriers have a subcarrier in common;

step (b) comprises, for each subset of modulated subcarriers, transforming both the subset of modulated subcarriers and one or more unmodulated subcarriers to form the corresponding time-domain subsymbol; and for each group of data symbols, the sum of (1) the number of the modulated subcarriers and (2) the number of the one or more unmodulated subcarriers is equal to the total number of subcarriers in the set; and (c) combining the M time-domain subsymbols to form the combined modulated symbol, wherein at least one step of the method is performed by at least one apparatus.

* * * * *